United States Patent
Kirjavainen et al.

(10) Patent No.: US 6,551,534 B1
(45) Date of Patent: Apr. 22, 2003

(54) METHOD AND ARRANGEMENT FOR COOLING AN EXTRUDED HOLLOW PRODUCT

(75) Inventors: Kari Kirjavainen, Espoo (FI); Jyri Järvenkylä, Hollola (FI)

(73) Assignee: Uponor Innovation AB, Fristad (SE)

( * ) Notice: Subject to any disclaimer, the term of this patent is extended or adjusted under 35 U.S.C. 154(b) by 0 days.

(21) Appl. No.: 09/142,418
(22) PCT Filed: Apr. 17, 1997
(86) PCT No.: PCT/FI97/00237
  § 371 (c)(1),
  (2), (4) Date: Nov. 3, 1998
(87) PCT Pub. No.: WO97/38844
  PCT Pub. Date: Oct. 23, 1997

(30) Foreign Application Priority Data

Apr. 17, 1996 (FI) .................................................. 961682

(51) Int. Cl.$^7$ ........................... B29C 47/80; B29C 47/88
(52) U.S. Cl. ............................. 264/37.17; 264/211.12; 264/237; 264/348; 425/71; 425/72.1; 425/378.1; 425/380
(58) Field of Search ............................ 425/71, 72.1, 74, 425/378.1, 379.1, 380, 461; 264/37.17, 209.4, 211.19, 211.12, 237, 348

(56) References Cited

U.S. PATENT DOCUMENTS

| | | | |
|---|---|---|---|
| 3,314,108 A | 4/1967 | Wienano et al. | |
| 3,613,162 A | 10/1971 | Talsma | |
| 3,980,746 A | * 9/1976 | Carrow | 425/378.1 |
| 4,573,897 A | * 3/1986 | Piazzola | 425/378.1 |
| 4,591,467 A | 5/1986 | Kopernicky | |
| 4,632,564 A | 12/1986 | Kopernicky | 366/75 |
| 4,750,873 A | * 6/1988 | Loe et al. | 425/72.1 |
| 4,789,327 A | * 12/1988 | Chan et al. | |
| 4,846,645 A | * 7/1989 | Cole | 425/72.1 |
| 5,028,376 A | 7/1991 | Vanderwoude | 264/566 |
| 5,387,386 A | * 2/1995 | Kirjavainen | 425/131.1 |
| 5,525,289 A | * 6/1996 | Lupke et al. | 425/72.1 |

FOREIGN PATENT DOCUMENTS

| | | |
|---|---|---|
| DE | 2415585 | 1/1976 |
| DE | 2455779 | 8/1976 |
| DE | 2519705 | 11/1976 |
| EP | 0079104 | 5/1983 |
| EP | 0122885 | 10/1984 |

\* cited by examiner

Primary Examiner—James P. Mackey
Assistant Examiner—Joseph Leyson
(74) Attorney, Agent, or Firm—Ladas & Parry

(57) ABSTRACT

The invention relates to a method and an arrangement for cooling an extruded hollow product. According to the invention, the extruder (1) is provided with means for sucking air through the pipe (2). The air to be sucked is thus in contact with the inner surface of the pipe (2), cooling the pipe from the inside. Therefore the cooling of the pipe (2) can be realized in an efficient and simple manner. By arranging the sucking to occur from the middle of the conical extruder (1), no weld line will be formed in the extruded product, and the extruder (1) can be cooled effectively from the inside. According to the invention, the heat contained by the air that has been sucked through the pipe (2) can also be utilized.

20 Claims, 2 Drawing Sheets

METHOD AND ARRANGEMENT FOR COOLING AN EXTRUDED HOLLOW PRODUCT

FIELD OF THE INVENTION

The invention relates to a method for cooling an extruded hollow product, in which method the product is cooled after the extruder from the inside of the product by sucking air through it, whereupon the air is in contact with the inner surface of the product thus cooling it.

The invention further relates to an arrangement for cooling an extruded hollow product, the arrangement comprising an extruder and means arranged to suck air through the product in such a way that the air cools the product from the inside.

BACKGROUND OF THE INVENTION

U.S. Pat. No. 3,613,162 discloses an extruder comprising a conduit placed inside a mandrel. A cooling fluid is supplied to the conduit for cooling the mandrel and for cooling the extruded pipe, by means of the mandrel, from the interior of the pipe. However, the cooling of the pipe is inefficient, since the mandrel has to be cooled first. Further, the structure of the arrangement is cumbersome, expensive and consumes considerable amounts of energy.

DE 2,529,705 discloses an extruder where a calibration means is placed inside the pipe after the nozzle, and a cooling medium is fed into the calibration means, whereupon the pipe can be calibrated from the inside and it is simultaneously cooled. The internal calibrator is followed by an external calibrator, which is also arranged to calibrate and simultaneously cool the plastic pipe. Also in this case, the cooling of the pipe is inefficient, since the cooling medium cools first the calibration means and only then the pipe. Further, the structure of this arrangement is cumbersome and therefore expensive and complicated. Also, all the energy used for heating and cooling is wasted.

EP 0,079,104 discloses an equipment comprising means for sucking gas through a pipe to be extruded in order to cool the pipe. The equipment is arranged to suck air via a conduit placed in the middle of the mandrel, and the air is conducted from the conduit via a duct that is transverse to the conduit through the housing of the extruder. This arrangement produces a weld line in the product to be extruded. Further, the thermal energy of the pipe and the cooling means is completely wasted.

U.S. Pat. No. 5,028,376 discloses an equipment wherein a funnel-shaped blowing apparatus is placed in the middle of the extruder and produces an air flow when pressurized gas is supplied to the apparatus. As a result of the air flow, cooling air passes along the inner surface of the pipe and cools it, and heated air is discharged from the middle of the pipe. The equipment is complicated and cumbersome, and the method can only be used in pipes with a large diameter. The equipment also cools the extruder to some extent from the middle, but the cooling flow of air only circulates near the end of the extruder, wherefore the extruder is not cooled effectively. It is also difficult to place the apparatus in the middle of the extruder. Further, all the thermal energy of the pipe and the cooling apparatus is wasted.

SUMMARY OF THE INVENTION

The purpose of the present invention is to provide a method and an arrangement which comprise none of the aforementioned problems and with which cooling can be realized in a simple manner and with low total costs. In accordance with the invention, there is provided a method for preparing an extruded hollow product comprising:

(a) extruding material by feeding the material into an extruder, said extruder comprising at least one stator and at least one rotatable rotor for forcing the material from a supply side of the extruder onto a mandrel at an exit side of the extruder, the mandrel and the at least one stator defining an orifice that gives form to the extruded hollow product; and (b) sucking air through the extruded hollow product such that the air is sucked through one end of the product, contacts an inner surface of a wall of the product and cools the product and such that the air is then sucked through the extruder from an output end to an opposite second end.

The method according to the invention is characterized in that the air sucked through the product is further conducted through the extruder so that the extruder is also simultaneously cooled.

Further, the arrangement according to the invention is characterized in that the air sucked through the product is arranged to flow through the extruder.

The essential idea of the invention is that the extruder comprises a blower by means of which air can be sucked through the product to be extruded, whereupon the air is in contact with the inner surface of the product simultaneously cooling the pipe from the inside. The air is sucked through the extruder. A further idea is that the heat of the air sucked with the blower is utilized for example by conducting the air into the material that is to be supplied, whereupon the heated air that has been sucked through the product emits heat for warming the material to be supplied to the extruder. The idea of a preferred embodiment is that a cooling element is also placed outside the pipe, whereupon the pipe is simultaneously cooled from both the outside and the inside.

The invention has the advantage that the pipe extruded with the extruder can be cooled in an efficient and simple manner. When the air is sucked through the extruder, the product contains no weld lines and the extruder can also be cooled effectively from the inside. By feeding the air that has been sucked through the pipe for example into the material to be supplied to the extruder, the thermal energy that would otherwise be entirely wasted can be recovered for a useful purpose. The heating of the material to be supplied also increases the yield of the extruder, since heated material can be used. By cooling the extruded pipe simultaneously from the outside and the inside, the section where the cooling takes place can be made shorter, since the cooling is effective. Due to the simultaneous cooling from the outside and the inside, the residual stresses remain small. Also, the sawing waste produced when the pipe is cut can be recovered with the apparatus according to the invention and conducted back into the material to be supplied for use.

BRIEF DESCRIPTION OF THE DRAWINGS

The invention will be described in greater detail in the accompanying drawings, in which.

DETAILED DESCRIPTION

Figure 1:
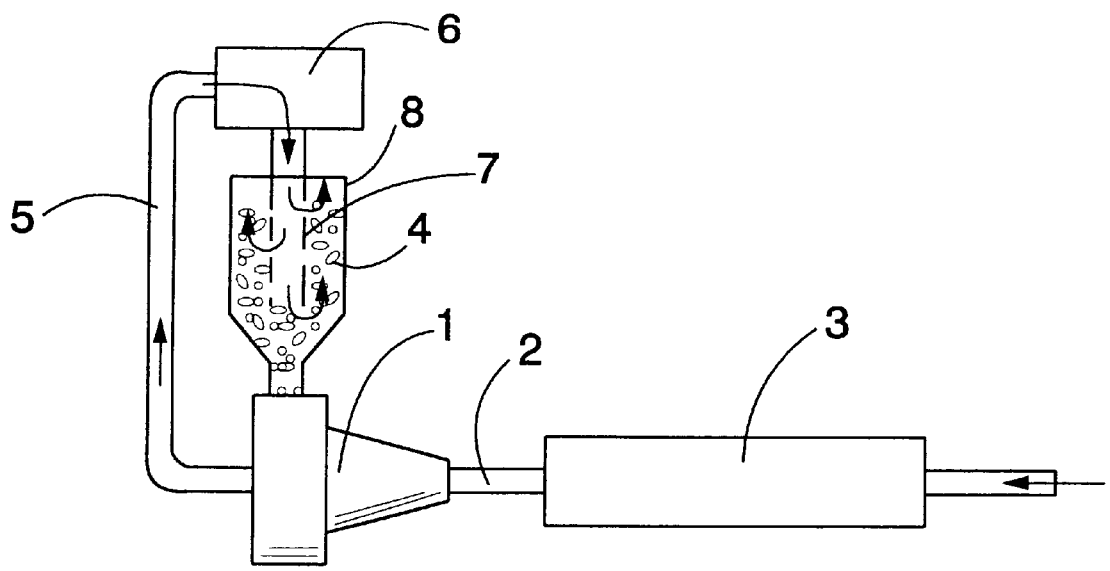
FIG. 1 shows schematically an arrangement according to the invention.

FIG. 1 shows an extruder 1. The extruder produces a pipe 2, a film or some other hollow product. When the pipe 2 exits the extruder 1, it is rather hot, wherefore a cooling basin 3 is placed to cool it from the outside. The cooling basin 3 thus cools the pipe 2 from the outside for example by means of water. The use of other cooling mediums is also possible. The structures of the extruder 1 and the cooling basin 3 are fully known to a person skilled in the art, wherefore they will not be discussed in greater detail in this connection.

The plastic material 4 required for manufacturing the pipe 2 us supplied to the extruder 1 for example with a feeding hopper 8. The plastic material 4 may be for example plastic granulate or a plastic material that is in some other suitable form in a manner known per se. Further, the material can be supplied to the extruder with feed screws or in some other manner known per se, instead of with the feeding hopper 8.

The arrangement further comprises a blower 6. The blower 6 is connected to a connecting pipe 5 in such a way that air is sucked along the connecting pipe 5 with the blower 6. The connecting pipe 5 is further connected to the pipe 2, whereupon air can be sucked through the pipe 2 with the blower 6. The air is discharged from the pipe 2 to the connecting pipe 5 and finally to an outlet pipe 7. The outlet pipe 7 is in turn placed inside the feeding hopper 8 and the plastic material 4, whereupon air can be conducted into the plastic material 4. The air to be sucked into the plastic pipe 2 can be at room temperature, in which case it is considerably cooler than the surface of the plastic pipe, however. During its flow through the plastic pipe 2 the air warms up, and this heated air is conducted along the connecting pipe 5 to the outlet pipe 7 and through the plastic material 4, whereupon the heated air warms the plastic material 4. The walls of the outlet pipe 7 are preferably perforated, whereupon heated air can flow via these openings to the feeding hopper 8, i.e. the heated air s evenly mixed with the material 4. The arrows in the accompanying figure illustrate the flows of air.

At the cooling basin 3, the pipe 2 is subjected to cooling simultaneously from the outside and the inside. The pipe therefore cools effectively and will not contain great residual stresses.

With the arrangement it is possible to supply warm air to the plastic material 4, whereupon the plastic material warms up and the yield of the extruder can be increased. The sawing waste produced in cutting the pipe can also be recovered and supplied back to the plastic material 4 for a further use. Also, with the arrangement it is possible to recover heat that is generated in the extruder 1 during the manufacture of the pipe 2. The tests that have been conducted have shown that in order to recover thermal energy of about 10 kW, the power of the blower 6 has to be typically about 1 kW. The tests have also shown that: typically about 25% of the thermal energy can be recovered.

Figure 2:
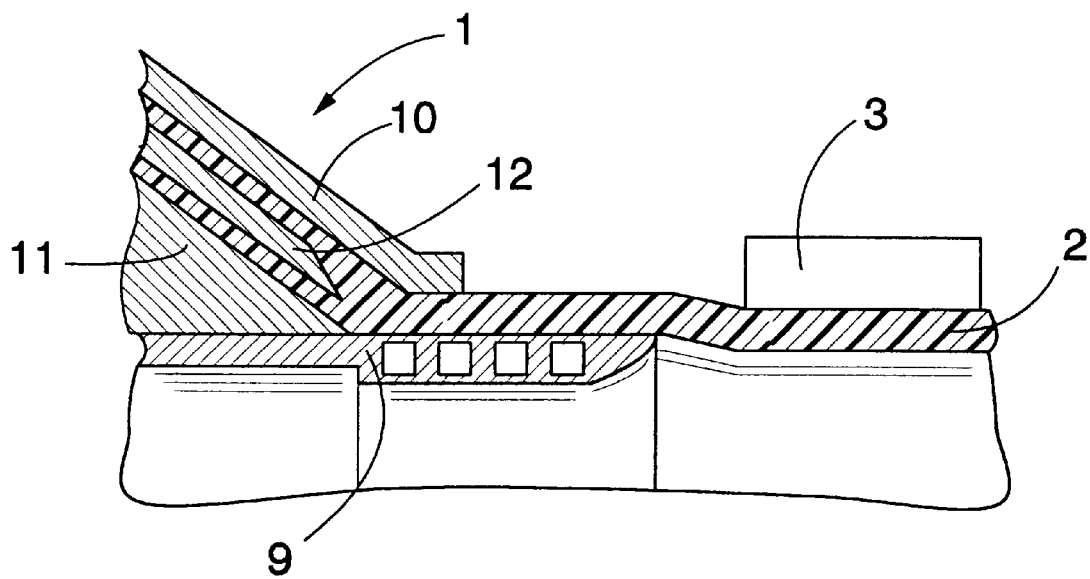
FIG. 2 is a schematic side view, in cross-section, of a detail of another arrangement according to the invention.

FIG. 2 is a schematic side view, in cross-section, of a detail of a second arrangement according to the invention. The numerals of FIG. 2 correspond to the numerals in FIG. 1. The extruder 1 comprises an outer stator 10 and an inner stator 11 and a conical rotor 12 placed rotatably between the stators. At the conical rotor 12, at least the inner surface of the outer stator 10 and the outer surface of the inner stator 11 are conical. The rotor 12 comprises screw-shaped grooves, which are not shown in FIG. 2 for the sake of clarity, whereupon during its rotation the rotor 12 supplies plastic material out of the extruder 1 by means of the grooves. In the middle of the above-described supply means, there is a hollow stationary mandrel 9 that comprises cooling means, such as water circulation, for cooling the inner surface of the pipe 2, whereupon the inner surface of the pipe 2 can be cooled thinly with the mandrel 9 so that the inner surface of the pipe 2 can be made smooth. The end of the mandrel 9 is made round from the inside so that substantially no turbulence that slows down the flow is formed in the air to be sucked. In the case of FIG. 2, the air can be sucked through the mandrel 9 and the pipe 2 from the middle of the extruder 1 provided with the conical supply means. No weld lines are then formed in the product to be extruded, and the extruder can simultaneously be cooled efficiently from the inside. The cooling apparatus according to the invention can also be utilized in the adjustment of the surplus heat of the extruder together with the heating resistors of the stators. Especially when materials having a high molecular weight are processed, for example when pipes of cross-linked polyethylene are prepared, the weld line and the overheating of the extruder due to the strong friction are especially great problems. With the arrangement according to the invention, when the extruder is continuously cooled from the inside, the temperature of the extruder can be reduced sufficiently and adjusted exactly to the correct level by means of the heating resistors. There may naturally be more than one conical rotor 12 and only one or more than two stators 10 and 11. Further, the stator may be provided either outside or inside the rotor or between two rotors.

Figure 3:
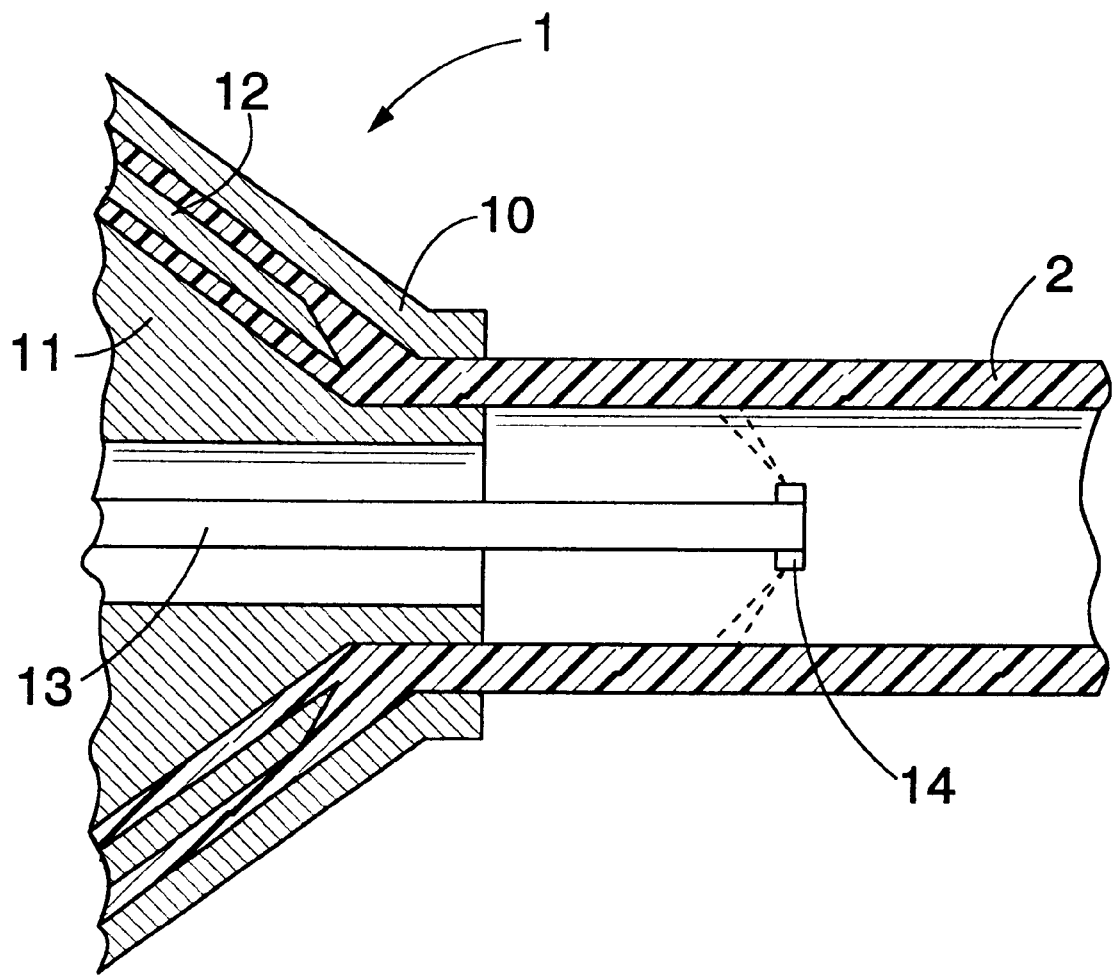
FIG. 3 is a schematic side view, in cross-section, of a detail of a third arrangement according to the invention.

FIG. 3 is a schematic side view, in cross-section, of a detail of a third arrangement according to the invention. The numerals of FIG. 3 correspond to those of FIGS. 1 and 2. Inside the extruder 1 there is also a water pipe 13 in addition to the air passage. The water pipe 13 is used to conduct water to cool the inner surface of the pipe 2. Water is sprayed to the inner surface of the pipe 2 with nozzles 14. The nozzles 14 are most preferably formed in such a way that they can spray to the inner surface of the pipe 2 water fog that cools the pipe 2 very effectively. The nozzles for producing the water fog may be for example of the type described in WO 92/20453. In such a case, the amount of the water to be used is not too great, either. Air can be sucked through the pipe 2 and the extruder 1 either with a separate blower or by directing the sprays diagonally towards the extruder 1 so that the sprays produce a flow of air. The water pipe 13 may also be provided, if required, with associated optional means for conducting air or pressurized air to the nozzles 14, or other similar means. The water pipe 13 and the nozzles 14 may be movable in the axial direction in order to select the optimum point of cooling. Further, there may also be nozzles 14 in several different points of the water pipe 13 in the axial direction.

The drawings and the description related thereto are only intended to illustrate the inventive idea. The details of the invention may vary within the scope of the claims. Therefore, heat may also be transferred from the cooling air to the feeding hopper 8 by means of, for example, a heating pump. In such a case, the thermal energy of the pump itself could also be advantageously transferred to the feeding hopper 8 to be mixed with the plastic material 4. Further, the hanging up of the plastic in the feeding hopper 8 can be prevented in a simple and effective manner in such a way that the blower 6 which produces a great deal of vibration energy is mechanically fastened to the feeding hopper 8.

What is claimed is:

1. A method for preparing an extruded hollow product comprising:

(a) extruding material by feeding the material into an extruder, said extruder comprising at least one stator and at least one rotatable rotor for forcing the material from a supply side of the extruder onto a mandrel at an exit side of the extruder, the mandrel and the at least one stator defining an orifice that gives form to the extruded hollow product; and (b) sucking air through the extruded hollow product such that the air is sucked through one end of the product, contacts an inner surface of a wall of the product and cools the product and such that the air is then sucked through the extruder from an output end to an opposite second end and reduces a temperature of the extruder sufficiently to mitigate against overheating due to friction of material forced between the rotor and stator.

2. A method according to claim 1 comprising recovering thermal energy from the air that has been sucked through the product and the extruder.

3. A method according to claim 1 comprising, prior to the extruding step, supplying the material to the extruder for extruding in step (a).

4. A method according to claim 3 comprising heating the material supplied to the extruder with air that has been sucked through the product and the extruder.

5. A method according to claim 4, comprising cooling the product by spraying water fog against the inner surface.

6. A method according to claim 1, comprising cooling the product by spraying water fog against the inner surface.

7. A method according to claim 1, wherein said rotor is conical and said stator is conical at least in a part thereof that is adjacent the rotor.

8. A method according to claim 1, comprising cooling the product from an exterior thereof.

9. A method according to claim 5, comprising cooling the product from an exterior thereof.

10. A method according to claim 1, wherein said mandrel comprises cooling means for cooling the material extruded thereon, said method comprising cooling the extruded material with the cooling means.

11. A method according to claim 1, wherein the material is fed into the extruder in step (a) in particulate form.

12. An apparatus comprising (a) an extruder for extruding material, said extruder comprising at least one stator and at least one rotatable rotor for forcing the material from a supply side of the extruder onto a mandrel at an exit side of the extruder, the mandrel and the at least one stator defining an orifice that forms the material into a hollow extruded product comprising a wall with an inner surface; and (b) blower means for sucking air (i) through the hollow extruded product such that the sucked air contacts the inner surface and cools the product and (ii) through the entire extruder to cool the extruder so as to mitigate against overheating due to friction of material forced between the rotor and stator without sucking air through the wall of the product.

13. An apparatus according to claim 12, wherein the at least one rotor is conical and the at least one stator is conical in at least a part thereof that is adjacent the at least one rotor, and wherein said blower means sucks air through a middle of said extruder.

14. An apparatus according to claim 12, further comprising recovery means for recovering thermal energy from air that has been sucked through the product.

15. An apparatus according to claim 12, further comprising means for recovering thermal energy from air that has been sucked through the product and for conducting the thermal energy to the material prior to extrusion of the material in the extruder.

16. An apparatus according to claim 15, wherein the means for recovering and conducting comprises conduit means, including a conduit, for conducting the air that has been sucked through the product into the material prior to extrusion of the material in the extruder.

17. An apparatus according to claim 12, further comprising pipe means, including a pipe and a nozzle, for spraying water fog against the inner surface of the wall to cool the product.

18. An apparatus according to claim 17, further comprising exterior cooling means for cooling the wall.

19. An apparatus according to claim 12, wherein said mandrel comprises means for cooling the inner surface of the wall of the product.

20. An apparatus according to claim 16, further comprising supply means for supplying the material to the extruder, wherein the conduit means conducts the sucked air into the supply means.

\* \* \* \* \*